W. A. & M. D. NORMAN.
PEANUT PLANTER.
APPLICATION FILED NOV. 27, 1916.
1,267,583.
Patented May 28, 1918.
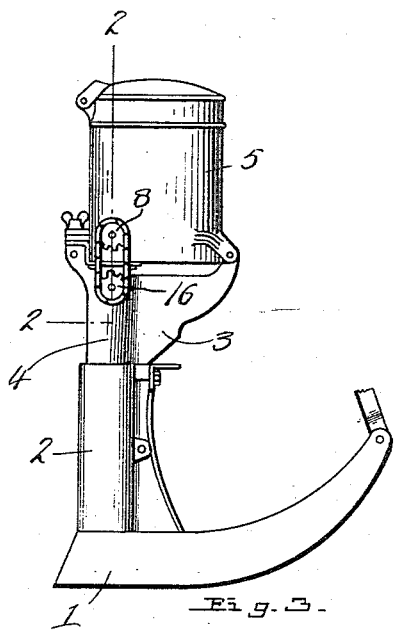
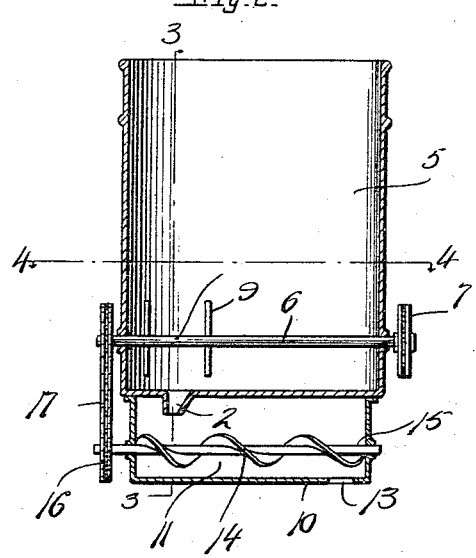
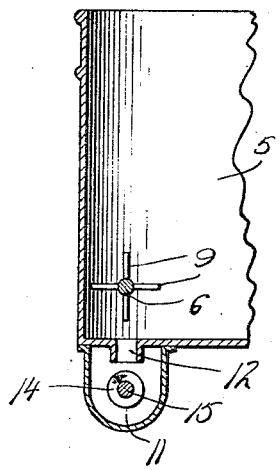
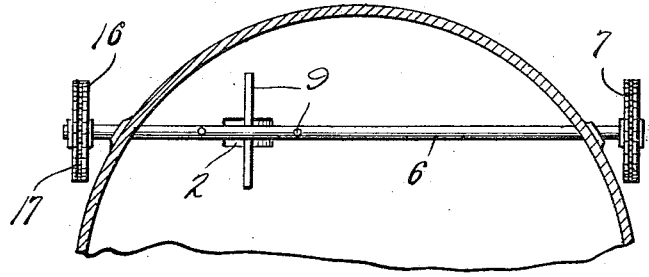
WITNESSES
INVENTOR
William A. Norman.
Mack D. Norman.
BY
ATTORNEY

UNITED STATES PATENT OFFICE.

WILLIAM A. NORMAN AND MACK D. NORMAN, OF SALTILLO, TEXAS.

PEANUT-PLANTER.

1,267,583. Specification of Letters Patent. Patented May 28, 1918.

Application filed November 27, 1916. Serial No. 133,749.

*To all whom it may concern:*

Be it known that we, WILLIAM A. NORMAN and MACK D. NORMAN, citizens of the United States, residing at Saltillo, in the county of Hopkins and State of Texas, have invented certain new and useful Improvements in Peanut-Planters, of which the following is a specification.

This invention relates to new and useful improvements in a planter and more particularly to a device for evenly and uniformly disposing seed peanuts during the planting operation whereby the required quantity of seed may be deposited in the soil.

One of the objects of the invention is to provide a supplemental seed container adapted to receive the seed from the main container, the supplemental container containing means for uniformly dividing the contents of the supplemental container into equal groups of seeds for permitting the same to be deposited uniformly in the soil.

A further object of this invention is the provision of a planter which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of our invention, in which;

Figure 1 is a side elevation of a fragmentary portion of a planter showing our invention in use.

Fig. 2 is an enlarged section through the main seed container and the supplemental seed container.

Fig. 3 is a section on the line 3—3 of Fig. 2.

Fig. 4 is a horizontal section on the line 4—4 of Fig. 2.

Referring to the drawing, wherein is illustrated the preferred form of our invention, and in which like numerals of reference indicate corresponding parts throughout the several views, the usual construction of the planting structure is illustrated in Fig. 1 and comprises the runner or shoe 1 which receives the seed from the chute 2. A supporting bracket 3 comprises a part of the planter structure and has the tubular portion 4 whereby communication is established between the main seed container 5 and the tube 2 for depositing the seeds in the runner 1.

As clearly shown by Figs. 2, 3 and 4 of the drawing, the main seed container 5 is provided with a transversely extending shaft 6 having its ends rotatably mounted in bearings provided at opposite points in the wall of the container 5. Mounted upon one end of the shaft is a drive pinion 7 which may be in the nature of a belt pulley, the shaft 6 being rotated by power imparted to the member 7 from any preferred source. The opposite end of the shaft 6 is projected beyond the wall of the main container 5 and is provided with a sprocket 8. Within the said container 5, the shaft carries a plurality of agitating arms 9 adapted to rotate with the shaft for mixing and agitating the peanuts or seeds within the container.

Fastened to the bottom of the main container 5 is a supplemental container 10 which, as shown by Fig. 3 of the drawing, is substantially semi-cylindrical in formation thereby providing a trough 11 for receiving the seeds from the main container through the spout 12, the latter being formed integrally with the bottom wall of the container and projected slightly into the supplemental container. It is to be observed, by referring to Fig. 2 of the drawing, that the spout 2 projects into the supplemental container at one end thereof while the opposite end of the supplemental container is provided with an outlet opening 13. Rotatably mounted within the supplemental container is a helical screw or spiral conveyer 14 which is mounted upon a shaft 15 the ends of which are rotatably mounted in the end walls of the supplemental container. Mounted on one end of the shaft 15 is a sprocket 16 similar to the sprocket 8 on the shaft 6. A drive chain 17 connects the two sprockets 8 and 16 whereby the spiral conveyer 14 may be rotated when the shaft 6 is rotated.

When in operation, the shaft 6 will be rotated thereby causing the agitating members 9 to thoroughly mix the seeds within the main container at a point directly above the spout 12 for causing the seeds to freely drop through the spout 12. This action will cause the seeds to be deposited in the trough 11 of the supplemental container. The rotary motion of the spiral conveyer 14 will cause the seeds, as they are deposited in the trough 11, to be separated into groups of equal numbers that is, each revolution of the spiral conveyer will cause a certain number of seed to be moved forwardly in the trough 11 and toward the outlet opening 13 in the bottom of the trough. When the seeds reach the opening 13, which will be in registration with the tube 4, the seeds will be deposited through the tubes 4 and 2 thus providing a series of evenly spaced seed deposits. It will be noted that a change of ratio between the sprockets 16 and 8 will vary the speed of the spiral conveyer 14 and, in this manner, the seed deposits may be regulated to a greater or less distance apart. The pitch of the spiral conveyer or helical screw 14 is also an element that is to be considered in determining the proper spacing of the seed deposits and, it will be understood, that a screw of any preferred pitch may be employed within the supplemental container.

From the foregoing it will be observed that a very simple and durable planter has been provided, the details of which embody the preferred form. We desire it to be understood however, that slight changes in the minor details of construction may be made without departing from the spirit of the invention or the scope of the claim hereunto appended.

We claim:

A planter comprising a main container and a supplemental container attached thereto and beneath the same, a spout leading from the main container to the supplemental container near one end of the latter, the bottom of the supplemental container having a discharge opening at the end opposite to the said spout, agitating arms mounted in the main container above the said spout, one of the said arms being directly above the opening, the other arms being on opposite sides of the opening, a spiral conveyer rotatably mounted in the said supplemental container, and means for simultaneously rotating the said agitating elements and the said conveyer.

In testimony whereof we affix our signatures in presence of two witnesses.

WILLIAM A. NORMAN.
MACK D. NORMAN.

Witnesses:
H. D. ARTHUR,
C. J. PARCHMAN.